United States Patent
Alleysson et al.

(10) Patent No.: US 11,057,593 B2
(45) Date of Patent: Jul. 6, 2021

(54) METHOD FOR RECONSTRUCTING A COLOUR IMAGE ACQUIRED BY A SENSOR COVERED WITH A MOSAIC OF COLOUR FILTERS

(71) Applicant: CENTRE NATIONAL DE LA RECHERCHE SCIENTIFIQUE, Paris (FR)

(72) Inventors: David Alleysson, Moirans (FR); Prakhar Amba, Grenoble (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/977,915

(22) PCT Filed: Feb. 20, 2019

(86) PCT No.: PCT/EP2019/054222
§ 371 (c)(1),
(2) Date: Sep. 3, 2020

(87) PCT Pub. No.: WO2019/170420
PCT Pub. Date: Sep. 12, 2019

(65) Prior Publication Data
US 2020/0413012 A1    Dec. 31, 2020

(30) Foreign Application Priority Data
Mar. 7, 2018 (FR) ......................... 1851978

(51) Int. Cl.
*H04N 9/04* (2006.01)
*G06T 3/40* (2006.01)

(52) U.S. Cl.
CPC ....... *H04N 9/04515* (2018.08); *H04N 9/0455* (2018.08); *H04N 2209/046* (2013.01)

(58) Field of Classification Search
None
See application file for complete search history.

(56) References Cited

U.S. PATENT DOCUMENTS 7,149,262 B1    12/2006    Nayar et al.
8,564,699 B2    10/2013    Alleysson et al.
(Continued)

OTHER PUBLICATIONS

French Search Report from French Patent Application No. 1851978 dated Nov. 5, 2018.
(Continued)

*Primary Examiner* — Mark T Monk
(74) *Attorney, Agent, or Firm* — Greer, Burns & Crain, Ltd.

(57) ABSTRACT

A method for reconstructing a colour image acquired by a photosensitive sensor covered with a mosaic of filters of different colours making up a base pattern, obtaining the product of a demosaicing matrix with a matrix representation of a mosaic image coming from the sensor following acquisition of the colour image by the sensor, the product of the demosaicing matrix with the matrix representation of the mosaic image performing an interpolation of the colour of each pixel of the mosaic image as a function of a pixel neighbourhood of a base pattern corresponding to the base pattern of the mosaic of filters.

15 Claims, 7 Drawing Sheets

(56) References Cited

U.S. PATENT DOCUMENTS 8,964,250 B2 2/2015 Alleysson et al.
2002/0191854 A1* 12/2002 Kakarala ............... H04N 1/646
382/240

OTHER PUBLICATIONS

International Search Report and Written Opinion for International Patent Application No. PCT/EP2019/054222, dated May 16, 2019.
Trussell, H., et al., "Mathematics for Demosaicking," IEEE Transactions on Image Processing, vol. 11, No. 4, Apr. 2002, pp. 485-492.

* cited by examiner

METHOD FOR RECONSTRUCTING A COLOUR IMAGE ACQUIRED BY A SENSOR COVERED WITH A MOSAIC OF COLOUR FILTERS

BACKGROUND

The invention is in the field of the processing of images acquired by a single-sensor camera. The invention relates more particularly to the reconstruction of colour images following their acquisition by a sensor covered with a filter composed of a mosaic of filters of several colours.

In general, a camera comprises at least one objective composed of one or more optical components such as lenses. The camera's objective directs the light captured onto a sensor composed of photosensitive cells. One or more colour filters are applied to the sensor in order to allow reconstitution of the spectrum of the light received by the sensor.

A camera may further comprise, on the optical path between the objective and the sensor, one or all of the following components: a filter that cuts the infrared (IRcut), an optical low-pass (OLP) spatial filter, microlenses for focusing the light onto each cell of the sensor.

A camera may be a photographic apparatus or any other means able to capture an image and having a photosensitive sensor provided with a matrix of colour filters, called a mosaic.

The general principle of the acquisition of a colour image 1 by a first photosensitive sensor 2 through a first mosaic of filters 3 is shown in FIG. 1a. The first mosaic of filters 3 gives each pixel 4 of the first sensor 2 a different spectral sensitivity to allow faithful representation of the colour on the image produced. Each pixel 4 of the first sensor 2 represents a photosite of the first sensor 2. Each photosite is a photoelectric cell sensitive to the luminous intensity, in a certain wavelength range, which it translates by producing a small electric current relating to its spectral sensitivity.

FIG. 1a shows an example of a matrix of filters composed of a first mosaic of filters 3 of different colours. The example shows a first matrix of filters 3 of size H×W comprising six filters of different colours arranged according to a first base pattern 6, an example of which is shown in FIG. 1b. The first base pattern 6, of dimensions h×w, is repeated so as to cover the entire first mosaic of filters 3 without any overlap between two base patterns.

The colour image acquired 5 is an image with P colour components, i.e. with P colours. The P colour components are, in the example shown in FIG. 1b, the colours of six filters F1, F2, F3, F4, F5, F6. The six filters F1, F2, F3, F4, F5, F6 are arranged in the first base pattern 6 of size 3×3. The light carrying the colour image to be acquired 1 passes through the first matrix of filters 3 before arriving on the first sensor 2 shown in FIG. 1a in the form of a matrix of pixels. The first matrix of filters 3 is arranged to completely cover the first sensor 2 of size H×W.

The reconstruction of an image after its acquisition by the first sensor 2 covered with the first mosaic of filters 3 uses a method called demosaicing or dematrixing. Since each pixel 4 is covered with a filter of a particular colour, a single colour is sampled per pixel. It is therefore necessary to implement a method for reconstructing the composition in colours of the light received by each pixel 4. A demosaicing method is used for this purpose. The demosaicing method consists in particular of interpolation of the chrominances of the different pixels 4. The demosaicing method uses a demosaicing matrix applied to the raw image 5 produced by the first sensor 2. By "raw image" 5 is meant the data leaving the first sensor 2 directly, after acquisition of the colour image 1.

The construction of a demosaicing matrix is carried out during a training process using a database of reference images. The database of reference images may comprise N reference images $I_i$, $i \in [1, \ldots, N]$ with P components. Starting from the database of reference images, a new database of N simulated images $J_i$ is constructed. One simulated image $J_i$ corresponds to each reference image $I_i$. The simulated images $J_i$ represent a modelling of the raw images 5 produced by the first sensor 2 after acquisition of the images of the database of reference images by said first sensor 2. The simulated images $J_i$ are obtained starting from the reference images $I_i$ and by eliminating from the latter the colour components that are not measured by the first sensor 2. In practice, if the reference image $I_i$ has P components, in the simulated image $J_i$ only the component of the filter positioned on each pixel of the first sensor 2 is kept. The simulated image $J_i$ then comprises a single plane. The simulated images $J_i$ of the raw images 5 from the first sensor 2 are called mosaic images 5 hereinafter, and the images $I_i$ originating from the reference database are called resolved images.

FIG. 2a shows an example of a transformation of a mosaic image $J_i$ into a vector matrix x. FIG. 2b shows an example of a transformation of a resolved image $I_i$ into a vector matrix y representing the colour image. The mosaic image $J_i$ is composed, as shown in FIG. 2a, of a set of base patterns of size h×w. The vector matrix x of the mosaic image $J_i$ comprises HW/(hw) vectors of size hw. The resolved image $I_i$ comprises P components, each component corresponding to one of the P colours. Each component of the resolved image $I_i$ is an image of a size equivalent to the size H×W of the first mosaic of filters 3. Each component of the resolved image $I_i$ may be cut according to a pattern the size of which is equivalent to the size of the first base pattern 6 of the first mosaic of filters 3: h×w. It is thus possible to define a vector matrix y representing a resolved image constructed with HW/(hw) vectors of size Phw.

The model for calculation of the mosaic image $J_i$ starting from the resolved image $I_i$ may be expressed thus:

$$x = My \qquad (1000)$$

where M is a matrix of size hw×Phw.

FIG. 2c shows an example of a matrix M created for a filter made starting from a second base pattern 20 of a Bayer matrix of size 2×2 comprising the following colour filters: a first red filter 21, a second green filter 22, a third green filter 23 and a fourth blue filter 24. The matrix M obtained for this pattern is therefore of size 4×12. The matrix M is composed of "0" and "1". Each component of the matrix M having the value "1" represents a cell of the second base pattern 20 of the Bayer matrix. To obtain demosaicing, it is known from the state of the art to use a so-called demosaicing matrix D defined by the method of least squares, applied to all of the vector matrices (x; y) representing the mosaic images $J_i$ and the resolved images $I_i$, respectively. The demosaicing matrix D cannot be obtained simply by inverting the matrix M. In fact, even if inversion of the matrix M can be carried out using a method of the pseudo inverse type, this operation produces a matrix D giving poor results in the demosaicing process.

The demosaicing matrix D can therefore be calculated as follows:

$$D = E^{i=1 \cdots N}\{(yx^T(xx^T)^{-1}\} \qquad (1001)$$

$E^{i=1\cdots N}$ representing the expected value for the N images of the reference database compared with the N images of the database of the simulated images. The demosaicing matrix D thus calculated is of size Phw×hw.

Starting from the calculated demosaicing matrix D, it is possible to determine a vector matrix ŷ that is an estimate of the image reconstructed according to the mosaic image from the first sensor 2.

$$\tilde{y}=Dx \quad (1002)$$

Then, to reconstruct the colour image with P components, it is sufficient to transform the vector matrix ŷ into an image with P components, each component corresponding to one of the P colours; this transformation is the inverse operation of the operation shown in FIG. 2b. Each component is thus an image of a size corresponding to the size H×W of the mosaic image.

One of the problems of this method for reconstructing colour images is that the image to be reconstructed is larger than the captured colour image 1. The model used for image reconstruction then carries out an interpolation of P colours for a pixel starting from a single item of colour information, that of the pixel. This results in considerable instability of the matrix D thus calculated and therefore a poor quality of reconstruction of the colour image.

The state of the art proposes carrying out an interpolation starting from the neighbourhood of each pixel of the mosaic matrix in order to determine its colour. Such an interpolation makes it possible to reinforce the stability of the estimate of the demosaicing matrix D. It was proposed in patent applications FR2959092 and FR2917559 to use, for carrying out this interpolation, a so-called sliding neighbourhood as shown in FIG. 2d. FIG. 2d shows a part of a mosaic matrix produced by a second sensor. The base pattern of size h×w used for the example shown in FIG. 2d is a fourth base pattern 25 of size 2×2 of a Bayer mosaic. The fourth base pattern 25 comprises four pixels of different colours: red 26, green 27 and blue 28. To simplify the representation, one of the pixels of the fourth base pattern 25 is left white. Each pixel 26, 27, 28 has its own pixel neighbourhood of size 3×3 of which it is the centre. For example the first red pixel 26 is at the centre of a first pixel neighbourhood 200; the second green pixel 27 is at the centre of a second neighbourhood 201; the third blue pixel 28 is at the centre of a third neighbourhood 202. The second pixel 27 is located on the same column but in the lower row relative to the first pixel 26. Thus, the second neighbourhood 201 is a translation of a pixel towards the bottom of the first neighbourhood 200. The third pixel 28 is located on the same row but in the column to the right relative to the first pixel 26. Thus, the third neighbourhood 202 is a translation of a pixel towards the right of the first neighbourhood 200. All the pixels of one and the same base pattern therefore have a different neighbourhood. When passing from one base pattern to another base pattern on the mosaic matrix, the neighbourhood of each pixel "follows" the pixel in its translation from one pattern to another.

During reconstitution of the image, the colour of each pixel can therefore be reconstituted as a function of the colours of the pixels in its neighbourhood. Thus, the matrix D is defined by integrating the neighbourhoods of each pixel as follows: in the construction of the vector matrices x, y each pixel is increased by its neighbourhood and therefore the different neighbourhoods of each pixel are also stored in the vector matrices x, y. Even if taking the neighbourhoods into account in the calculation of the demosaicing matrices makes it possible to have better reconstruction of the image, it has the drawback of having to manipulate larger matrices and therefore requires substantial means for calculation and data storage.

SUMMARY

An aim of the invention is in particular to propose an improvement of the known methods for calculating a demosaicing matrix. Another aim of the invention is to use this improvement in order to propose an optimization of the mosaics of filters associated with the sensors.

For this purpose, the present invention proposes a method for reconstructing a colour image, acquired by a photosensitive sensor of size H×w, covered with a mosaic, of size H×W, of P filters of different colours making up a base pattern of size h×w such that h<H and w<W. Said base pattern of the mosaic of filters is repeated so as to cover the mosaic of filters without overlap between the base patterns. Said method is carried out by computer. Said method comprises at least the following steps:

a first preliminary step of constructing a demosaicing matrix D starting from a simulation using a first database of N images $I_i$, $i \in [1, \ldots, N]$, with P colour components, called reference images, for producing a second database of N images $J_i$, $i \in [1, \ldots, N]$ simulating images produced from the sensor, after acquisition by said sensor of the images of the first database, said reference images $I_i$ and images produced $J_i$ being represented respectively in the form of matrices of HW/(hw) vectors $y_1$, $x_1$ such that:

the components of $y_1$ are the P components of a reduced neighbourhood of size $n_h \times n_w$ of one of the HW/(hw) base patterns applied to the reference image $I_i$, the components of $x_1$ are the components of a reduced neighbourhood of size $n_h \times n_w$ of one of the HW/(hw) base patterns applied to the image produced $J_i$, with $n_h > h$ and $n_w > w$;

a second step of reconstructing a colour image producing the product of the demosaicing matrix D with a matrix representation of a mosaic image originating from the sensor after acquisition of the colour image by said sensor, said product of the demosaicing matrix D with the matrix representation of the mosaic image using an interpolation of the colour of each pixel of the mosaic image as a function of a neighbourhood, of size $n_h \times n_w$ pixels, of a base pattern of size h×w, corresponding to the base pattern of the mosaic of filters.

Advantageously, the size of the neighbourhood may be defined by $n_h n_w = $ Phw.

A first demosaicing matrix $D_1$ may be expressed as an expected value E calculated for the N reference images of the first database: $D_1 = E^{i=1 \cdots N}\{(yx_1^T(x_1x_1^T)^{-1}\}$, where y is a matrix of HW/(hw) vectors of size Phw representing the colour image.

The first demosaicing matrix $D_1$ may be expressed thus: $D_1 = S_1 R M_1^T (M_1 R M_1^T)^{-1}$ with $x_1 = M_1 y_1$, $M_1$ being a matrix of projection of $y_1$ on $x_1$, $y = S_1 y_1$, $S_1$ being a matrix of reduction of the neighbourhood of the vector $y_1$ and of transformation of the vector $y_1$ into y, and $$R = \frac{1}{NPHW} E^{i=1\ldots N}\{y_1 y_1^T\}$$

being a correlation matrix of the resolved images of the first database expressed as a function of the reduced neighbourhoods of size $n_h \times n_w$.

The demosaicing matrix may be expressed as a function of the spectral sensitivity of the sensor and of the spectral functions of the P filters of different colours.

As the first database may alternatively comprise multi-spectral reflectance images, a second demosaicing matrix $D_2$ can be defined by the expression:

$$D_2 = F^T CLS_1 R' L_1^T C_1^T F_1 M_1^T (M_1 F_1^T C_1 L_1 R' L_1^T C_1^T F_1 M_1^T)^{-1},$$

with $R' = \frac{1}{NHWP_\lambda} E^{i=1...N}\{z_1 z_1^T\}$,

The second demosaicing matrix $D_2$ may be constructed according to the following steps:

calculation of a vector matrix $y_0$ representing an image with P components as a function of a vector matrix $z_0$ representing a multi-spectral reflectance image obtained from a reflection of an object illuminated by a light source of spectral power density $L(\lambda)$, $\lambda$ being a spectral component, such that: $y_0 = F_0^T C_0 L_0 z_0$, where $F_0$ is a matrix of size $P_\lambda \times P$ of spectral transmission functions of the filters of the mosaic, $C_0$ is a diagonal matrix of size $P_\lambda \times P_\lambda$ of a spectral sensitivity of the sensor, $L_0$ is a diagonal matrix of size $P_\lambda \times P_\lambda$ of the spectral power densities of the light source;

construction of the vector matrix $y$ starting from the multi-component image and a vector matrix $z$, constructed starting from the multi-spectral reflectance image, said vector matrices $y$ and $z$ comprising said base pattern, such that $y = F^T CL_z$ with $F = I_{hw} \otimes F_0$, $I_{hw}$ being an identity matrix of dimensions $hw \times hw$, $C = I_{hw} \otimes C_0$, and $L = I_{hw} \otimes L_0$;

construction of a vector matrix $z_1$ composed of the reduced neighbourhoods of size $n_h \times n_w$ of the base pattern of the multi-spectral reflectance image such that $y_1 = F_1^T C_1 L_1 z_1$, $y_1$ being a matrix composed of the reduced neighbourhoods of size $n_h \times n_w$ of the base pattern of size $h \times w$ of the multi-spectral reflectance spectral image, with $F_1 = I_{n_h n_w} \otimes F_0$, $I_{n_h n_w}$ being an identity matrix of dimensions $n_h n_w \times n_h n_w$, $L_1 = I_{n_h n_w} \leq L_0$, and $C_1 = I_{n_h n_w} \otimes C_0$;

construction of the second demosaicing matrix $D_2$ with $M_1$ being a matrix of projection of $y_1$ onto $x_1$ and $S_1$ being a matrix of reduction of the neighbourhood of the vector $y_1$ and of transformation into $y$.

$C_0$ may also be a product of the spectral sensitivities of components of the optical path of the camera and the spectral sensitivity of the sensor, where said components may comprise at least one of the following: an objective of the camera, an infrared filter, a low-pass spatial filter, a microlens system.

Each row of the demosaicing matrix $D$, $D_1$, $D_2$ can be expressed as a convolution filter.

The invention also relates to a data processing system comprising means for carrying out the steps of the method for reconstructing a colour image.

The invention also relates to a computer program product comprising instructions which, when the program is executed by a computer, lead the computer to carry out the steps of the method for reconstructing a colour image.

Another aspect of the invention is that it can be applied to a method for optimizing spectral functions of filters and arranging the filters on a mosaic of P different colour filters, repeated so as to fill a base pattern of size $h \times w$, said base pattern repeating so as to cover the mosaic of filters, said mosaic of filters being applied to a photosensitive sensor. Said method comprises a multicriteria optimization by minimizing an error of colour rendering and by minimizing a mean square error between an image originating from an ideal sensor, acquired starting from an image of a database of reference images, and an image originating from a sensor covered with the mosaic of P different filters, acquired starting from the same image of the database of reference images, said image acquired by the sensor covered with the mosaic of filters being reconstructed by the method for reconstructing a colour image.

The method of optimization further comprises minimizing an error of colour rendering between the image originating from the ideal sensor acquired starting from the image of the database of images, and an image originating from a sensor covered with a series of P filters, each of the P filters covering the whole of the sensor, said image being acquired starting from the same image of the database.

The method of optimization further comprises minimizing an error of colour rendering between a Macbeth test chart acquired by a perfect sensor and a Macbeth test chart acquired by a sensor provided with the mosaic of the P filters.

The invention also relates to a data processing system comprising means for carrying out the steps of the method of optimization.

The invention further relates to a computer program product comprising instructions which, when the program is executed by a computer, lead the computer to carry out the steps of the method of optimization.

Advantageously, the invention makes it possible to improve the speed of execution of the demosaicing algorithm as well as the overall size of the memory of a calculator used in the context of carrying out the invention.

BRIEF DESCRIPTION OF THE DRAWINGS

Other advantages and features of the invention will become apparent on examining the detailed description of several embodiments, which are in no way limitative, and the attached drawings, in which.

DETAILED DESCRIPTION

Figure 1A:
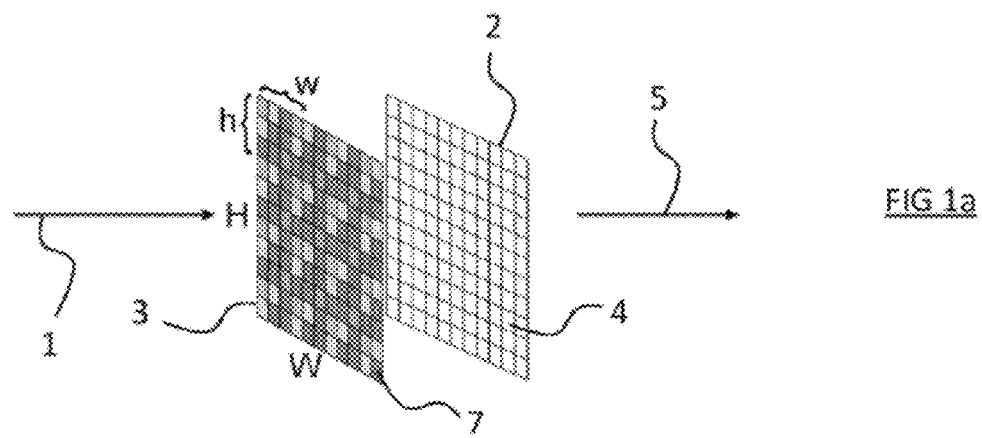
FIG. 1a shows a general principle of acquisition of an image by a sensor provided with a mosaic of filters.
Figure 1B:
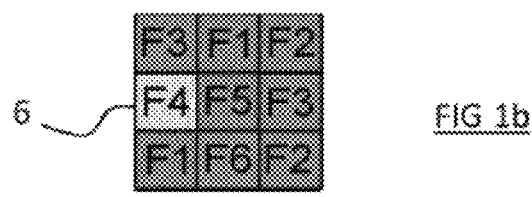
FIG. 1b shows an example of a base pattern for a mosaic of filters.

The present invention relates in particular to the acquisition of a multi-chromatic or multi-component colour image of size H×W. In FIG. 1a, the image comprises P colour components. The image with P colour components 1 is acquired by a first photosensitive sensor 2 after the light from an object passes through a first mosaic of filters 3, or matrix, composed of filters 7 of P different colours. Said mosaic of filters 3 is of size H×W. The first sensor 2 is defined by a pixel matrix 4 of size H×W. Each filter 7 is of the size of one pixel 4 of the first sensor 2 and covers one pixel 4 of the first sensor 2. The mosaic 3 of colour filters 7 is composed starting from the first base pattern 6 of size h×w with hw≥P. The first base pattern 6 comprises h×w colours, which may or may not be different. For example, in FIG. 1b the first base pattern 6 comprises two red filters F1, two orange filters F2, two green filters F3, one pink filter F4, one blue filter F5 and one yellow filter F6. The filters F1, F2, F3, F4, F5, F6 of the first base pattern 6 are arranged according to a particular arrangement. In the example shown in FIG. 1b, the first base pattern 6 is in the form of a 3×3 matrix of filters arranged as follows, from left to right and from top to bottom: F3, F1, F2, F4, F5, F3, F1, F6, F2. In the matrix or mosaic 3 of colour filters, the first base pattern 6 is repeated so as to cover the whole of the mosaic 3 without overlap between the different base patterns 6. The size of the first base pattern 6 is defined in such a way that H is a multiple of h and W is a multiple of w. Other base patterns may be used without departing from the scope of the invention.

Once the image has been acquired by the first sensor 2, it is processed in order to reconstruct the multi-component image. The processing carried out on the raw image leaving the first sensor 2 is a demosaicing process using a demosaicing matrix $D_1$. The demosaicing matrix $D_1$ is obtained by the method of least squares applied to the vector matrices $x_1$, y:

$$D_1 = E^{i=1 \cdots N}\{yx_1^T(x_1 x_1^T)^{-1}\} \qquad (1003)$$

Figure 2A:
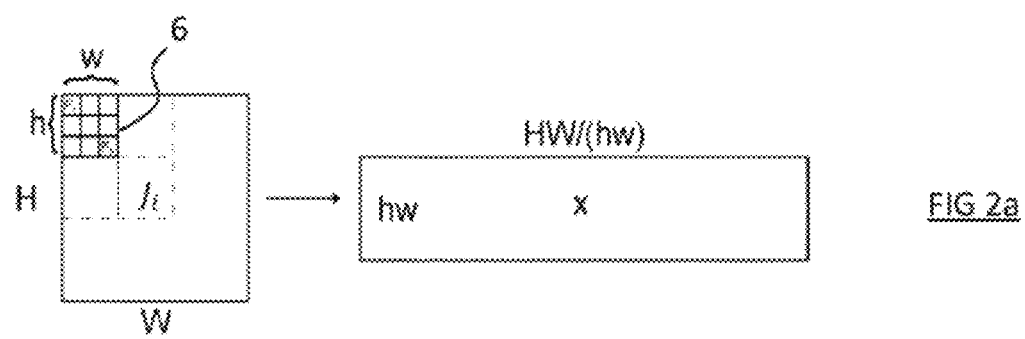
FIG. 2a shows a conversion of an image from a sensor provided with a mosaic of filters, into a vector matrix.
Figure 2B:
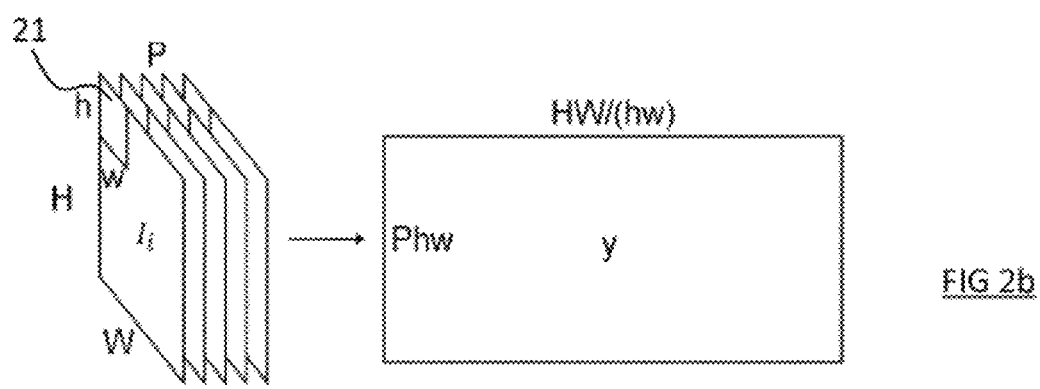
FIG. 2b shows a conversion of an image with several components into a vector matrix.
Figure 2C:
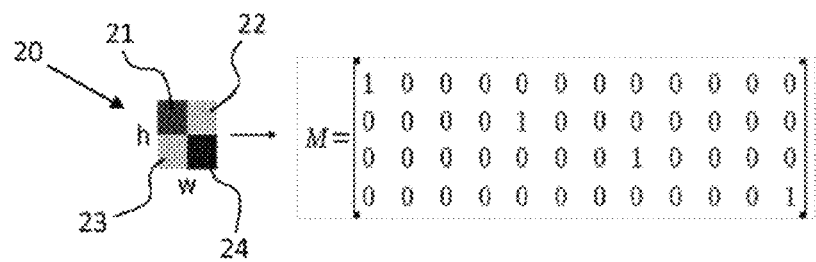
FIG. 2c shows an example of a calculation matrix of an image at the output of a sensor provided with a Bayer filter mosaic.

In expression (1003), y is a vector matrix as shown in FIG. 2b. The vector matrix y is obtained from a resolved image $I_t$ with P colour components forming part of a database of reference images used for constructing the matrix $D_1$ by training as described in the state of the art. The resolved image $I_t$ is of dimensions H×W and comprises a third base pattern 21 of size h×w. The vector matrix y is constructed by taking the P components from a third base pattern 21, i.e. the P components of each pixel of the third base pattern 21. Each vector of y is therefore of size Phw and y comprises HW/(hw) vectors of size Phw for representing all the information contained in a multi-component image I originating from the database of reference images.

Throughout the description, H×W is used indiscriminately for the size of a matrix or of an image. In the case of a matrix, H×w represents the number of rows H by the number of columns W of the matrix. In the case of an image, H×W represents the dimensions of the image corresponding to a matrix of size H×W. In the same way, the size of the first base pattern 6 is of h rows by w columns. In an image, by extension, a portion of the image is defined, the size of which corresponds to the size of the first base pattern 6 in a matrix of the same size as the image. It may thus be said that the base pattern 6 is applied to the image. By analogy, the image portion corresponding to the base pattern, such as the third base pattern 21 shown in FIG. 2b, will also be called base pattern. The size of the base pattern of the image is of the same dimensions as the base pattern of the matrix. By extension, the size of the base pattern of the image is defined as being h×w.

Figure 4A:
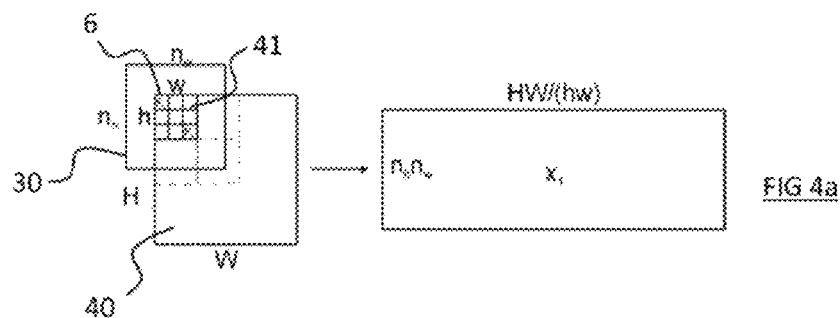
FIG. 4a shows a conversion of a mosaic image at the output of a sensor, into a vector matrix.

In expression (1003), $x_1$ is constructed as shown in FIG. 4a. Starting from the database of reference images, a simulation makes it possible to obtain a new database of raw images 40 containing data from the first sensor 2, simulated after acquisition of the images of the database of reference images by the first sensor 2. The data from the first sensor 2 form a raw image 40 of size H×W which may be decomposed into pixels 41, each pixel 41 corresponding to a response of a photosite of the first sensor 2 for example, as shown in FIG. 4a. The raw image 40 may be represented as a matrix of size H×w comprising the first base pattern 6 corresponding to the base pattern of the mosaic 3 of filters 7 as shown in FIG. 1a. In the example shown in FIG. 4a, each pixel corresponds to one of the P colour components and therefore to one of the P filters 7. In FIG. 4a, the components of the first base pattern 6 are designated $F_1$ to $F_p$. The first base pattern 6 of the mosaic image 40 is therefore of size h×w. In FIG. 4a, the base pattern is of size 3×3 for the example. According to the invention, a fourth pixel neighbourhood 30 is defined with respect to the first base pattern 6. The fourth neighbourhood 30 is of size $n_h \times n_w$. The fourth neighbourhood 30 according to the invention is called reduced neighbourhood 30 hereinafter. The size of the reduced neighbourhood 30 is defined according to the invention such that $n_h > h$ and $n_w > w$. It is possible for example to use a reduced neighbourhood such that $n_h n_w = Phw$. Advantageously, the reduced neighbourhood thus defined comprises a quantity and a quality of optimum colour information for describing the captured colour image 1.

Figure 2D:
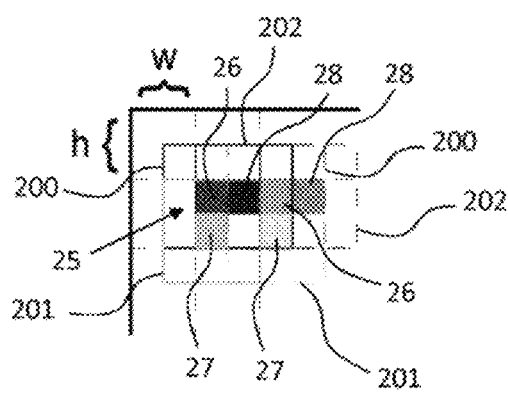
FIG. 2d shows an example of interpolation of a colour of a pixel using a sliding neighbourhood according to the state of the art.
Figure 3:
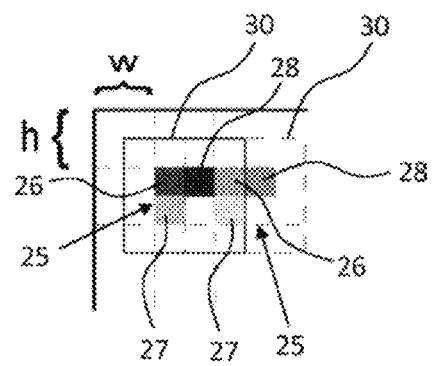
FIG. 3 shows an example of interpolation of a colour of a pixel using a neighbourhood according to the invention.

FIG. 3 shows a use of the reduced neighbourhood 30 according to the invention for carrying out the interpolation calculations of the colours of each pixel of the mosaic image 40. For example, the base pattern used is the fourth base pattern 25 as shown in FIG. 2d according to the state of the art. Thus, a reduced neighbourhood 30 of size 4×4 is defined for the example shown in FIG. 3 round the fourth base pattern 25. The reduced neighbourhood 30 has for example a size of one pixel more in width and in length than the fourth base pattern 25. The colour of each pixel of the fourth base pattern 25 is calculated by interpolating the colours of the pixels of the reduced neighbourhood 30. When passing from a fourth base pattern 25 to an adjacent fourth base pattern 25 on the mosaic image 40, the reduced neighbourhood 30 is translated on the mosaic image 40 by a number of pixels equivalent to the size of one side of the fourth base pattern 25, i.e. in the present example: two pixels. The neighbourhood 30 is called reduced as one and the same neighbourhood is used for all the pixels of one and the same base pattern: this same neighbourhood may be defined as the neighbourhood of the base pattern.

In general, the reduced neighbourhood 30 is defined such that $n_h > h$ and $n_w > w$. For example, $n_h n_w = Phw$ may be taken.

The same reduced neighbourhood 30 of size $n_h \times n_w$ according to the invention is therefore used for interpolating the colour of each pixel of the first base pattern 6 during reconstruction of the captured colour image 1 according to the invention. Thus, to construct the demosaicing matrix, the vector matrix $x_1$ is constructed in such a way that each vector comprises only the components of the reduced neighbourhoods 30 of each first base pattern 6 making up the mosaic image 40. Each vector of $x_1$ is therefore of size $n_h n_w$ and the matrix $x_1$ comprises HW/(hw) vectors of size $n_h n_w$. Thus, the demosaicing matrix $D_1$ of expression (1003) is of size Phw×$n_h n_w$. Advantageously, such a matrix is of a smaller size than a matrix according to the state of the art while maintaining good quality in the reconstruction of a colour image. For example, it can be shown experimentally that the image reconstructed with a sliding neighbourhood of size $n_h \times n_w$ has the same performance as a reduced neighbourhood of size $(n_h+h-1) \times (n_w+w-1)$. From a theoretical viewpoint, the two neighbourhoods cover the same domain of the mosaic image. For example, for a Bayer base pattern of size 2×2 and a sliding neighbourhood of size 3×3, the same results as with a reduced neighbourhood of size 4×4 are obtained in terms of performance.

Figure 4B:
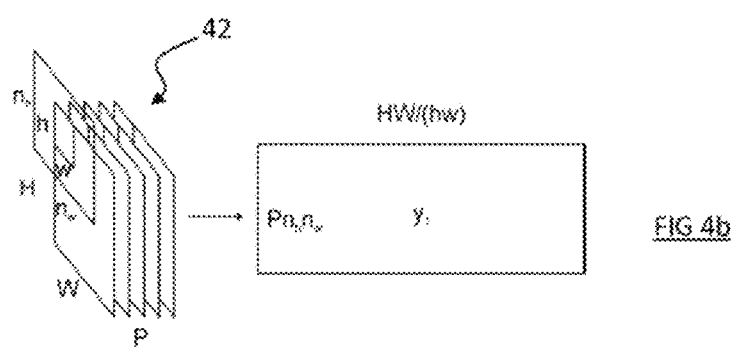
FIG. 4b shows a conversion of a multi-component image into a vector matrix.

It is also possible to define a vector matrix $y_1$, as shown in FIG. 4b. The vector matrix $y_1$ represents the resolved image with P components 42 in the form of a matrix of HW/(hw) vectors of size $Pn_h n_w$ constructed as the matrix y but taking the reduced neighbourhood 30 of the first base pattern 6 instead of the first base pattern 6 for each of the P components of the resolved image 42. Thus, by defining the following operators, it is possible to obtain a simplified version of the demosaicing matrix $D_1$.

A matrix $M_1$ of projection of the vector matrix $y_1$ of the resolved image with P components provided with its reduced neighbourhood 30 on the vector matrix $x_1$ of the mosaic image 40 provided with its reduced neighbourhood 30 is defined, such that:

$$x_1 = M_1 y_1 \quad (1004)$$

A matrix $S_1$ of reduction of the reduced neighbourhood 30 of the vector matrix $y_1$ for transforming it into the vector matrix y is defined, such that:

$$y = S_1 y_1 \quad (1005)$$

It is thus possible to define the demosaicing matrix $D_1$ as follows:

$$D_1 = S_1 R M_1^T (M_1 R M_1^T)^{-1} \quad (1006)$$

where R is the correlation matrix such that:

$$R = \frac{1}{NPHW} E^{i=1\ldots N}\{y_1 y_1^T\} \quad (1007)$$

Advantageously, using the formulation of $D_1$ according to expression (1006), it is possible to calculate just once the correlation matrix R of the colour images of the database of reference images, or resolved images, said resolved images being provided with their reduced neighbourhood 30 of size $n_h \times n_w$. Thus, it is possible to recalculate in a simple way the demosaicing matrix $D_1$ by modifying the operators $M_1$ and $S_1$ according to the mosaic of filters considered.

An estimate of the error associated with the demosaicing method can be expressed thus:

$$e = E^{i=1\ldots N}\{tr((\tilde{y}-y)(\tilde{y}-y)^T)\} \quad (1008)$$

therefore $$e = tr\{D_1 M_1 R M_1^T D_1^T + D_1^T + S_1 R S_1^T - S_1 R M_1^T D_1^T - D_1 M_1 R S_1^T\} \quad (1009)$$

where tr is the trace operator.

It is thus possible to evaluate a priori the performance of a particular mosaic of filters for encoding a database of reference images.

The database of reference images makes it possible to calculate R for a given size of reduced neighbourhood $n_h \times n_w$.

Defining the first base pattern 6 of the mosaic of filters makes it possible to calculate $M_1$, $S_1$ and $D_1$.

Based on these data, the mean error in the reconstruction of an image, associated with the use of a particular mosaic positioned on the first sensor 2, can be calculated directly from the database of reference images.

In the same way, it is possible to calculate a mean value of a colour difference between the reference images and the resolved images in the manner described below.

A matrix containing the spectral quantum efficiency of the filters is denoted $F_{QE}$. The spectral quantum efficiency can be measured with a monochromator, or estimated by an appropriate transformation if the spectral transmission functions of the filters are not known a priori. Measurement of the spectral quantum efficiency is carried out by proceeding with a recording of the data acquired by the first sensor 2 starting from the images corresponding to the quasi-chromatic light produced by the monochromator for each pixel of the base pattern. The levels of the images are then arranged in such a way that the levels of sensitivities associated with the exposure times during the measurement correspond, i.e. the levels of the images are multiplied by a factor depending on the exposure time for harmonizing the sensitivities in a given radiometric unit. To calculate a quantum efficiency of the P different pixels covered with the P different filters over a given wavelength range with a given wavelength spacing, an instrument is used for measuring the transparency of the filters, or the whole optical path, on NA intervals of wavelength. For example, for a range from 380 nm to 780 nm with a spacing of 1 nm, $N_\lambda = 401$ is obtained.

A transform of the filter space to the standardized trichromatic CIE 1931-XYZ colour space can be defined as follows:

$$FtoXYZ = XYZ^T F_{QE}(F_{QE}^T F_{QE})^{-1} \quad (1010)$$

where $F_{QE}$ is of size $N_\lambda \times P$, XYZ is a matrix of size $N_\lambda \times 3$ containing the spectral functions of the filters defined for the CIE 1931-XYZ colour space, and FtoXYZ is of size 3×P. FtoXYZ is a transformation matrix allowing a colour image with P components to be converted into an image the colour coordinates of which are expressed in the CIE 1931-XYZ colour space. The CIE 1931-XYZ colour space was defined by the International Commission on Illumination (CIE) in 1931. By extending the size of the transformation matrix FtoXYZ to the size of the vector y, the transformation $y_{XYZ}$ is obtained, defined by:

$$y_{XYZ} = (I_{hw} \otimes FtoXYZ) y \quad (1011)$$

in which $I_{hw}$ is an identity matrix of size hw×hw and $\otimes$ represents a Kronecker product.

An approximation of the mean square colour difference $E^{i=1\cdots N}\{\Delta E^2\}$ on the database of reference images for a given mosaic of filters and a defined size of neighbourhood is given by:

$$E^{i=1\ldots N}\{\Delta E\} = \sqrt{\overline{\Delta E^2}} \qquad (1012)$$

with:

$$\overline{\Delta E^2} = \qquad (1013)$$
$$tr(K(\tilde{y}-y)(\tilde{y}-y)^T K^T = tr\{KD_1M_1RM_1^T D_1^T K^T + KSRS^T K^T -$$
$$KSRM_1^T D_1^T K^T - KD_1M_1RS^T K^T\},$$

$$K = I_{hw} \otimes J', \qquad (1014)$$

$$J' = \left(\frac{1}{3}\begin{bmatrix} 0 & 116 & 0 \\ 500 & -500 & 0 \\ 0 & 200 & -200 \end{bmatrix} FtoXYZ\right) \qquad (1015)$$

J' being an approximation of the transform to the CIE L*a*b* colour space.

A representation in the CIE 1931-XYZ colour space is a linear representation of the visual system. Now, this representation is not satisfactory for predicting the colour differences. For that, therefore, the CIE L*a*b* colour space is used, which makes the colour space uniform so that it is closer to human perception. The CIE L*a*b* colour space was defined by the International Commission on Illumination (CIE) in 1976.

It is thus possible to test and evaluate different mosaics at lower computation cost, in particular because the calculation of R is carried out just once with the reduced neighbourhood 30 for each image of the first reference database, whatever mosaic is tested. It is thus possible to calculate a mean error in the reconstruction of the images of the reference database with a given mosaic.

Advantageously, it is possible to transform an image reconstructed by the demosaicing method according to the invention to any normalized space derived from the CIE 1931-XYZ colour space. For example, an sRGB space (meaning standard Red Green Blue) can be selected, which is a trichromatic colour space defined by standard CIE 61966-2-1 (1999). For example, a transformation to the sRGB colour space may be carried out as follows:

$$y_{sRGB} = A(I_{hw} \otimes FtoXYZ)\tilde{y} \qquad (1016)$$

Using expression (1002) applied to $D_1$ and $x_1$, the following is obtained:

$$y_{sRGB} = A(I_{hw} \otimes FtoXYZ)D_1x_1 \qquad (1017)$$

with $$A = I_{hw} \otimes \begin{bmatrix} 3.2406 & -1.5372 & -0.4986 \\ -0.9689 & 1.8758 & 0.0415 \\ 0.0557 & -0.2040 & 1.0570 \end{bmatrix} \qquad (1018)$$

A being a transformation matrix from the CIE 1931-XYZ colour space to the sRGB colour space.

Figure 5:
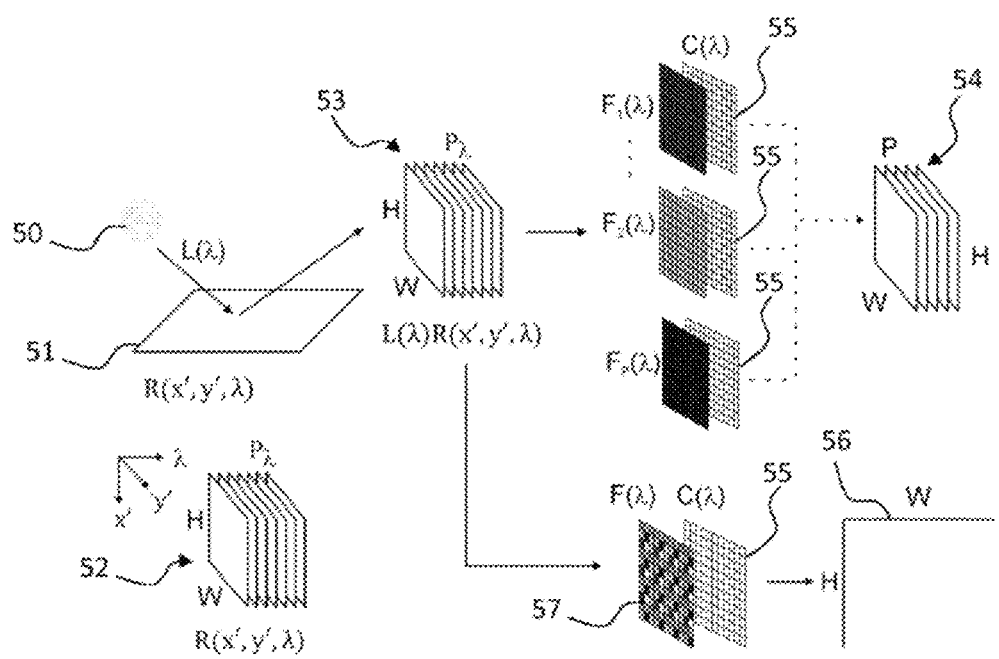
FIG. 5 shows an example of data acquisition for calculating a demosaicing matrix over a continuous spectral domain.

FIG. 5 shows a generalization of the calculation of the demosaicing matrix according to the invention to the entire spectral domain, i.e. to a continuous spectral domain. FIG. 5 shows a light source 50 of spectral power density $L(\lambda)$ defined as a function of the different spectral components $\lambda$, i.e. of the value of the energy between two given wavelengths. The light source 50 is reflected by a surface of an object 51 represented by a multi-spectral reflectance image $R(x',y',\lambda)$ 52. The reflectance represents a modulation of the spectrum of the light source 50 by the object 51 on which it is reflected. The multi-spectral reflectance image 52 is composed of PA images of size H×W defined in an orthogonal coordinate system $(x',y',\lambda)$. The reflection of the light 50 on the reflecting object or surface 51 gives a radiance image $L(\lambda)R(x',y',\lambda)$.

Figure 6A:
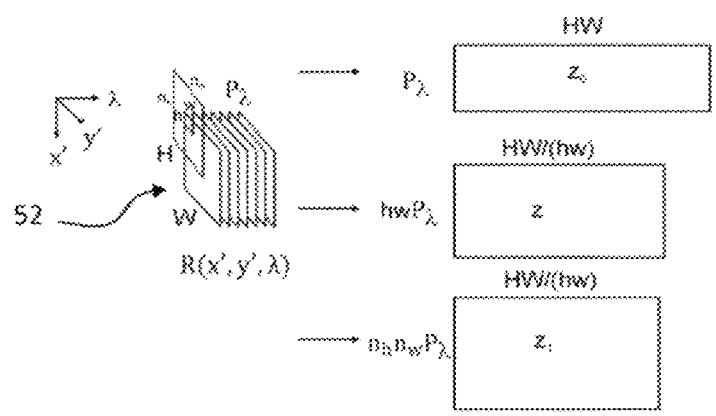
FIG. 6a shows conversions of a multi-spectral image into several different vector matrices.
Figures 6B, 7:
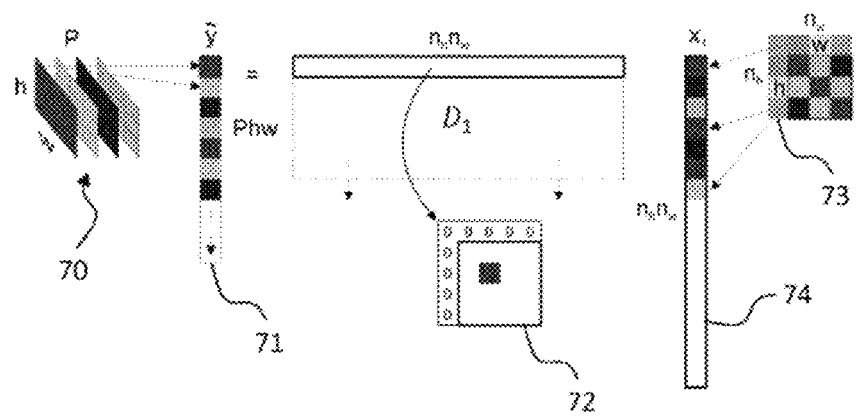
FIG. 6b shows a calculation of a vector matrix representing an image produced after acquisition of a multi-spectral image by a sensor combined with a filter.
FIG. 7 shows a principle of transformation of a demosaicing matrix into convolution filters.

It is possible to express a multi-component image 54 starting from the multi-spectral reflectance image, by multiplying the multi-spectral reflectance image 52 by the spectral power density $L(\lambda)$, to determine a radiance image 53. Then a matrix representing the radiance image 53 is multiplied by the transmission functions of the filters $F_1(\lambda), F_2(\lambda), \ldots, F_P(\lambda)$ as a function of the spectral component of the light and of $C(\lambda)$. This operation may be carried out in vector form as shown in FIGS. 6a and 6b. $C(\lambda)$ is defined as the spectral sensitivity of the optical path of the camera without the spectral sensitivity of the mosaic of filters. On its optical path, the camera may comprise an objective, an infrared filter, a low-pass spatial filter, a microlens system, and a third sensor 55. $C(\lambda)$ may then be defined as the product of the spectral transmission functions of each component of the optical path without the transmission functions of the filters of the mosaic. If only the sensor on the camera's optical path is considered, $C(\lambda)$ is the sensitivity of the third sensor 55. Alternatively, one or more components may also be considered on the optical path, in addition to the sensor, including: an objective, an infrared filter, a low-pass spatial filter, a microlens system.

The operation that is modelled by determining the demosaicing matrix is the reconstruction of a multi-component image starting from a mosaic image 56 produced by a third sensor 55 on which a second mosaic of filters 57, of spectral function $F(\lambda)$, is positioned after acquisition of the radiance image 53. The second mosaic of filters 57 is composed of P filters defined for PA ranges of values in the spectral domain. In general, a spacing of 10 nm is considered for a spectral domain from 400 nm to 700 nm. The third sensor 55 is similar to the first sensor 2 shown in FIG. 1a and the second mosaic of filters 57 is similar to the first mosaic of filters 3 shown in FIG. 1a.

FIG. 6a shows several vector transformations of the multi-spectral reflectance image 52, or several ways of unfolding said multi-spectral reflectance image 52.

A first vector matrix $z_0$ may be constructed, the vectors of which are spectral components of the multi-spectral reflectance image 52, of size $P_\lambda$. The first vector matrix $z_0$ is composed of HW different vectors.

A second vector matrix z representing the multi-spectral reflectance image 52 may also be constructed. To construct the second vector matrix z, the pixels are grouped together in groups of size hw, each group corresponding to the positions of the base patterns 6 on the second mosaic of filters 57 for all of the spectral components P$\lambda$. Thus, the second vector matrix z is composed of HW/(hw) vectors of size hwP$\lambda$.

A third vector matrix $z_1$ may be constructed starting from the multi-spectral reflectance image 52 using a neighbourhood of size $n_h \times n_w$ around each of the base patterns 6 on the second mosaic of filters 57. The cumulative vector of the spectral components of each of the pixels of the neighbourhood is of dimension $n_h n_w P_\lambda$. The third matrix $z_1$ is then composed of HW/(hw) different vectors.

FIG. 6b shows a calculation of a multi-component vector matrix $y_0$ starting from the first vector matrix $z_0$. The first vector matrix $z_0$, representing the multi-spectral reflectance image 52, is first multiplied by a diagonal matrix $L_0$ of dimensions $P_\lambda \times P\lambda$, the components of which are the $P_\lambda$ values of the spectral density $L(\lambda)$ of the light source, the other values of the matrix $L_0$ being set at zero. Then secondly, the result is multiplied by a diagonal matrix $C_0$ of dimensions $P_\lambda \times P_\lambda$. The diagonal matrix $C_0$ comprises, on its diagonal, the components of the spectral sensitivity $C(\lambda)$ of the optical path of the camera without the spectral transmission function of the mosaic of filters 57. The result is then multiplied by a transpose of a matrix $F_0$ of $P_\lambda$ spectral transmission functions of the P filters $F_1(\lambda)$, $F_2(\lambda)$, ..., $F_P(\lambda)$ of the mosaic of filters, said matrix $F_0$ being of size $P_\lambda \times P$. The result is therefore a multi-component vector matrix $y_0$ of size P×HW such that:

$$y_0 = F_0^T C_0 L_0 z_0 \qquad (1019)$$

In the same way as the vector matrix y is constructed starting from the multi-component resolved image $I_r$, as shown in FIG. 2b, i.e. incorporating the first base pattern 6, as shown in FIG. 4b, in the row vectors of said matrix, it is possible to construct the second vector matrix z starting from the multi-spectral reflectance image 52 by including the first base pattern 6 in the row vector. In this case, z is of dimensions $P_\lambda hw \times HW(hw)$. It is then possible to transpose expression (1019) to express y as a function of z:

$$y = F^T C L z \qquad (1020)$$

with the following expressions: $F = I_{hw} \otimes F_0$, $C = I_{hw} \otimes C_0$, and $L = \otimes I_{hw} L_0$ in which $I_{hw}$ is an identity matrix of size hw×hw.

The new demosaicing matrix $D_2$ applied to a multi-spectral image may then be written as:

$$D_2 = F^T C L S_1 R' L_1^T C_1^T F_1 M_1^T \\ (M_1 F_1^T C_1 L_1 R' L_1^T C_1^T F_1 M_1^T)^{-1} \qquad (1021)$$

such that:

$$R' = \frac{1}{NHWP_\lambda} E^{i=1...N}\{z_1 z_1^T\} \qquad (1022)$$

with $$y_1 = F_1^T C_1 L_1 z_1 \qquad (1023)$$

$$F_1 = I_{n_h n_w} \otimes F_0 \qquad (1024)$$

$$L_1 = I_{n_h n_w} \otimes L_0 \qquad (1025)$$

$$C_1 = I_{n_h n_w} \otimes C_0 \qquad (1026)$$

and $$x_1 = M_1 y_1 = M_1 F_1 C_1 L_1 z_1 \text{ and } y = S_1 y_1$$

The new demosaicing matrix $D_2$ thus defined makes it possible in addition to take into account any arrangement of the colours in the mosaic of filters, characterized by $M_1$, of the transmission functions of the filters $F_0$ and the spectral density of the light source $L_0$. Advantageously, the formulation of $D_2$ takes into account the definition of the reduced neighbourhood according to the invention.

It is also possible to calculate a priori the performance of a particular mosaic of filters, defined by the spatial arrangement of its filters, the spectral transmission functions of its filters and the light source used. For this purpose, it is possible for the equations for calculating the error of estimation associated with the demosaicing (1008), (1009) and the equations for calculating the colour difference (1012), (1013), (1014), (1015) associated with the demosaicing to be adapted to the multi-spectral domain.

The spectral quantum efficiency $F_{QE}$ of the filters is equivalent to the product of the transmission matrix of the filters F and C, C being the sensitivity of the sensor multiplied by the spectral transmission function of the components of the optical path of the camera without the mosaic of filters. By way of simplification, it is possible to consider only the sensitivity of the sensor for calculating C.

Advantageously, in equation (1021), the multiplication on the left by the expression $F^T C L S_1$ projects the image reconstructed according to the P colour components. In other words, $F^T C L S_1$ projects the $P_\lambda$ components of the spectral domain on the P colours of the filters of the mosaic.

If the projection of the image reconstructed according to the P colour components is not carried out, then a reconstruction filter of the multi-spectral images is obtained. It is thus possible to estimate a colour spectrum for each pixel of the image reconstructed starting from the mosaic image.

FIG. 7 shows a transformation of a demosaicing matrix, for example $D_1$ into a convolution filter.

A demosaicing matrix, such as the matrix $D_1$, makes it possible to reconstruct the vector matrix $\tilde{y}$ representing the image reconstructed starting from the vector matrix $x_1$ representing the mosaic image: $\tilde{y} = D_1 x_1$.

Each row of the demosaicing matrix may be regarded as a convolution filter that makes it possible to reconstruct one of the colours of one of the pixels of a fifth base pattern 70, of size h×w of the colour image, with P components. The fifth base pattern 70 is encoded as a first column vector 71 of size Phw, starting from a reduced neighbourhood 73, of size $n_h \times n_w$, of the base pattern hw comprising said corresponding pixel in the mosaic image. The reduced neighbourhood 73 is encoded as a second column vector 74.

Each row of the demosaicing matrix $D_1$ can be converted into an equivalent convolution filter 72 that is applied to each pixel of the mosaic image to reconstruct the pixels of the colour image with P components. Advantageously, expressing a demosaicing matrix as a set of convolution filters, each applicable to a pixel of the mosaic image, makes it possible to avoid converting the mosaic image into a vector matrix, which represents an expensive operation in terms of computation time, computation resources and memory. Advantageously, a reconstructed image is thus obtained which is not in the form of a vector matrix that has to be disassembled. It is thus possible to save on computation time, computation resources and memory by dispensing with the operation of transformation of the vector matrix of the reconstructed image into the complete reconstructed image, in which each pixel of the base pattern corresponds to a convolution filter.

Transformation into convolution filters may also apply to the demosaicing matrix $D_2$ of a multi-spectral mosaic image.

The invention also makes it possible to carry out a method of spectral optimization of the transmission functions of the filters and of the arrangement of the filters on a base pattern of a mosaic.

For this purpose, training of the filter or demosaicing matrix is used, using the method of least squares with a reduced neighbourhood 30 according to the invention. As seen above and in particular in expression (1021), the demosaicing matrix may be expressed by means of the spectral functions of the filters F. By means of the demosaicing matrix, it is possible to calculate the quality criteria MSE (for Mean Square Error) and ΔE of the reconstruction of the image captured by the third sensor 55, into a colour image with P components. It is thus possible to optimize the parameters of the spectral functions of the filters in order to maximize the quality criteria of the image produced.

Figure 8:
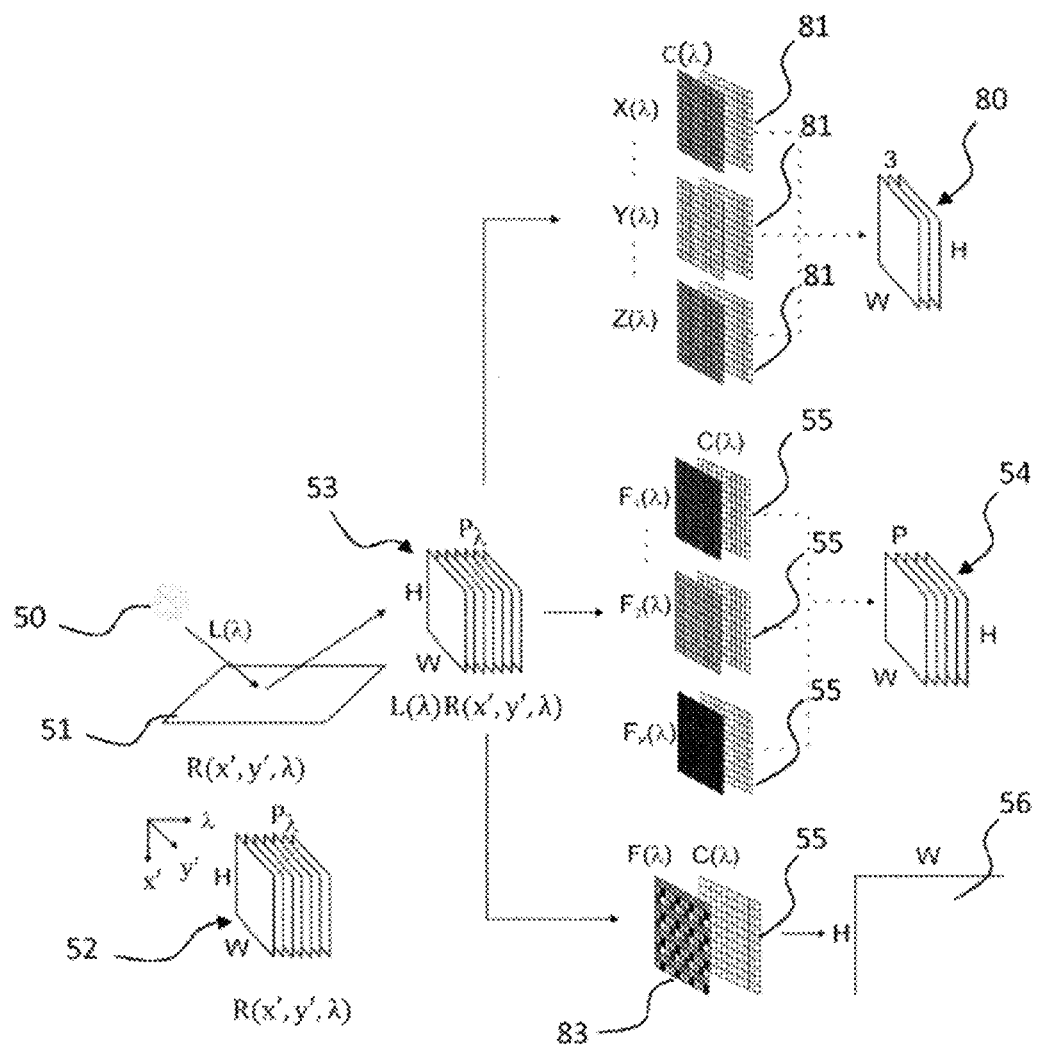
FIG. 8 shows an example of data acquisition for optimizing the arrangements and the spectral functions of the filters of a mosaic of filters.

As shown in FIG. 8, starting from an image acquired according to the principle shown in FIG. 1 and using the method according to the invention, it is possible to reconstruct an image with P colour components. It is also possible, using equation (1016) and those following, to reconstruct an image produced in a standardized trichromatic space such as the CIE 1931-XYZ space.

In FIG. 8, a model of formation of an image proposes a reconstruction of an image, starting from a multi-spectral reflectance image 52, among:

- a three-component image 80 in the CIE 1931-XYZ trichromatic space, produced by the expression $y_{XYZ} = FtoXYZ \times F^T LC_z$ starting from the multi-spectral reflectance image 52, each of the three components corresponding to one of the filters $X(\lambda)$, $Y(\lambda)$, $Z(\lambda)$;
- a multi-component image 54 with P components each corresponding to the output of one of the filters $F_1(\lambda)$, $F_2(\lambda)$, ..., $F_P(\lambda)$;
- a mosaic image 56 corresponding to the image acquired by the third sensor 55 directly via a third mosaic of filters 83 of spectral function $F(\lambda)$ in the form of a vector matrix, the vectors of which are the spectral functions of the filters $F_1(1)$, $F_2(1)$, ..., $F_P(1)$.

The radiance image 53 can be measured by a first theoretical ideal imaging system, which comprises a system for dividing the luminous flux into three components. Each of the components passes through filters $X(\lambda)$, $Y(\lambda)$, $Z(\lambda)$ and is then measured by a fourth ideal sensor 81. $C(\lambda)$ is the spectral sensitivity of the optical path of the camera including the sensor, but without the mosaic of filters. Such an ideal imaging system directly captures the coordinates X, Y, Z of each pixel in the CIE 1931-XYZ colour space and directly produces a so-called ideal colour image 80, with three components in the CIE 1931-XYZ colour space.

A second imaging system may be composed of P colour filters, the transmission function of which is given by $F_{i=1...P}(\lambda)$. The light passes through each of these P filters, and it is then measured by a third sensor 55. The third sensor 55 produces a multi-component image 54 with P colour components, each corresponding to one of the P filters $F_i(\lambda)$. The spectral sensitivity of the optical path of the camera including the third sensor 55, but without the mosaic of filters, is $C(\lambda)$. Alternatively, it can be considered that $C(\lambda)$ is solely the spectral sensitivity of the sensor.

A third imaging system is the one that it is attempted to model. It is composed of a second matrix, or mosaic, of filters 83 of P different colours arranged on the first base pattern 6 and duplicated in the size of the third sensor 55. The third imaging system also comprises the third sensor 55.

Starting from the first vector matrix $z_0$, a vector matrix $y_{XYZ}$ may be constructed corresponding to the ideal image of components XYZ such that:

$$y_{XYZ} = XYZ^T L_0 z_0 \quad (1027)$$

with, for example:

$$XYZ = \begin{bmatrix} X(380) & Y(380) & Z(380) \\ X(381) & Y(381) & Z(381) \\ \vdots & \vdots & \vdots \\ X(780) & Y(780) & Z(780) \end{bmatrix} \quad (1028)$$

$$L_0 = \begin{bmatrix} L(380) & 0 & \cdots & 0 \\ 0 & L(381) & \cdots & \vdots \\ \vdots & \cdots & \ddots & \vdots \\ 0 & \cdots & \cdots & C(780) \end{bmatrix} \quad (1029)$$

There is also:

$$C_0 = \begin{bmatrix} C(380) & 0 & \cdots & 0 \\ 0 & C(381) & \cdots & \vdots \\ \vdots & \cdots & \ddots & \vdots \\ 0 & \cdots & \cdots & C(780) \end{bmatrix} \quad (1030)$$

The matrix $y_{XYZ}$ is of size 3×HW and can be transformed into an image of size H×W×3 comprising the three components XYZ for each pixel of the reconstructed image.

Starting from the third matrix $z_1$ of size $n_h n_w P_\lambda \times HW(hw)$, the demosaicing matrix $D_2$ can be written according to expression (1021).

This manner of writing $D_2$ makes it possible to calculate once for the whole correlation matrix R' for all the images of the database of reference images. This makes it possible to calculate the demosaicing matrix $D_1$ for mosaics of filters defined a posteriori and encoded in the matrix $F_1$ of the spectral functions of the filters. Thus, the model of $D_2$ according to expression (1031) advantageously allows a direct expression of the demosaicing operator or matrix $D_2$ as a function of the data of the problem that is to be solved, namely an optimization of the spectral functions of the filters of the mosaic of filters. It is thus possible to obtain $F_1$ so as to optimize the quality of the reconstruction of the images acquired.

The optimization criteria used are the quality criteria of image reconstruction: spatial MSE and colorimetric ΔE.

The optimization criteria are calculated between an ideal image 80, produced by a fourth ideal sensor 81 starting from the multi-spectral reflectance image 52, and a mosaic image 56 acquired via the third mosaic of filters 83, demosaiced, i.e. dematrixed, and converted into a colour space allowing the calculation of the optimization criteria.

To calculate the optimization criteria, it is possible to adopt a position in the sRGB space or any other related space such as Adobe®RGB. To adopt a position in the sRGB space, the operations described above are carried out, i.e. conversion into the standardized trichromatic CIE 1931-XYZ colour space using equations (1010) and (1011) and then conversion into the sRGB space by means of equations (1016), (1017), (1018).

It is also possible to use another colour space. For example, a colour space that can be expressed on the basis of the XYZ space can be obtained by modifying matrix A. The other spaces require replacing FtoXYZ. For example, if a destination space is called ABC, it is necessary to estimate FtoABC by replacing XYZ with ABC in expression (1010).

It is also possible to calculate a criterion of the MSE type or a criterion of the PSNR type. PSNR (Peak To Noise Ratio) is a measure of colour distortion of the image. For two multi-component images expressed in the sRGB space, I'(x',y',c) and K'(x',y',c), normalized between 0 and 1, where c is one of the three colour components, the criterion MSE is calculated as:

$$MSE = \frac{1}{HWP}\sum_{x'=1...H}\sum_{y'=1...W}\sum_{c=1...P}(I'(x',y',c)-K'(x',y'c))^2 \quad (1031)$$

The criterion PNSR is calculated as follows:

$$PSNR = 10\log_{10}\frac{1}{MSE} \quad (1032)$$

The calculation of LE is carried out by approximating the non-linear calculation by a piecewise linear function in the following way, for two images I' and K' expressed in the XYZ reference system:

$$\Delta E = \sqrt{\frac{1}{HW}\sum_{x'=1...H}\sum_{y'=1...W}(I'(x',y',c)-K'(x',y',c))} \quad (1033)$$

in which:

$$K'' = \frac{1}{3}\begin{bmatrix} 0 & 116 & 0 \\ 500 & -500 & 0 \\ 0 & 200 & -200 \end{bmatrix} \text{diag}(XYZ,\text{diag}(XYZ^TL))^{-1} \quad (1034)$$

where diag is a function that places a vector in the diagonal of a matrix.

Figure 9:
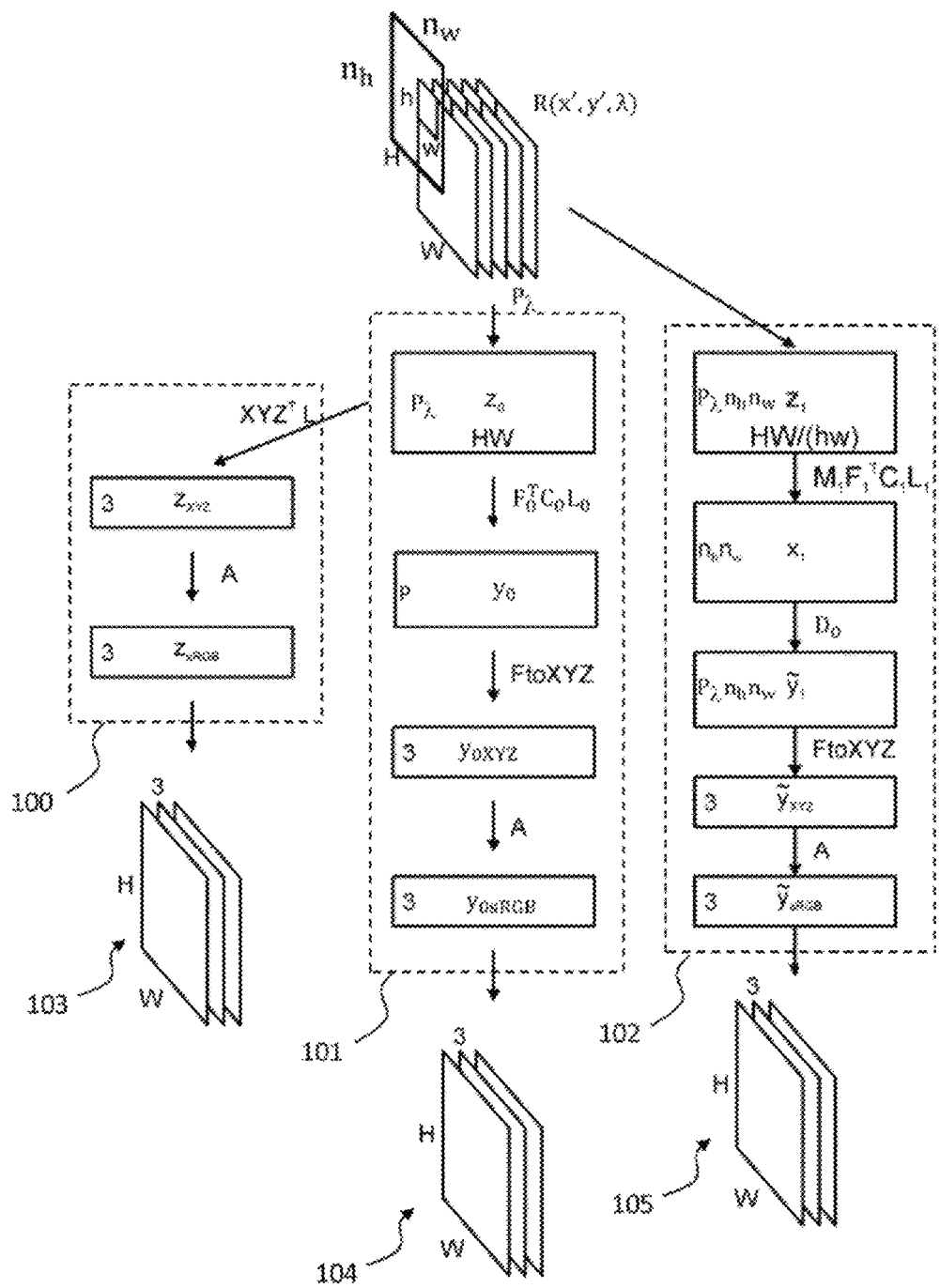
FIG. 9 shows calculations of different images used for optimizing the arrangements and the spectral functions of the filters of the mosaic of filters.

FIG. 9 shows the different operations carried out on the reflectance image R(x',y',λ).

As shown in FIG. 9, three different images are produced:
- a first three-component image 103 in the CIE 1931-XYZ colour space such as the ideal colour image 80;
- a second three-component image 104 originating from the third sensor 55 on which three colour filters are positioned, such as the multi-component image 54;
- a third three-component image 105 originating from the third sensor 55 on which a third mosaic of filters 83 is positioned, corresponding to the mosaic image 56.

Each image is from one of three different processing routes 100, 101, 102 at the output of the third and fourth sensors 55, 81.

A first route 100 uses a first processing of a second processing route 101 that consists of transforming the multispectral reflectance image R(x',y',λ) into a matrix $z_o$ of HW vectors of size PA as shown in FIG. 6a. It is also possible to start from the radiance image L(λ)R(x',y',λ).

Then a first processing of the first processing route 100 is a projection of the matrix $z_0$ into the XYZ space as described by equation (1027). A vector matrix $z_{XYZ}$ of size 3×HW is obtained.

Then the matrix $z_{XYZ}$ is projected into the sRGB space by applying to it matrix A as described in equations (1017) and (1018). A new matrix $Z_{sRGB}$ of size 3×HW is obtained. The matrix $z_{sRGB}$ may then be "unfolded" to reconstitute the first three-component image 103 of size H×W in the sRGB colour space.

The second route 101 carries out, on the vector $z_0$, the operation shown in FIG. 6b, to obtain the vector matrix $y_0$ according to equation (1019). The vector matrix $y_0$ is then transformed, as shown in FIG. 2b, into a matrix of HW/(hw) vectors of dimension Phw. Then the vector matrix $y_0$ is projected into the XYZ space by the function FtoXYZ as explained by relationship (1011). A matrix of three vectors $y_{OXYZ}$ of size HW is thus obtained. Then, the matrix $y_{OXYZ}$ is projected into the sRGB space by applying to it matrix A as described in equations (1017) and (1018). A new matrix $y_{OsRGB}$ of size 3×HW is obtained. The matrix $y_{OsRGB}$ may then be "unfolded" to reconstitute the second three-component image 104 of size H×W in the sRGB colour space.

A third route 102, starting from the multispectral reflectance image R(x',y',λ) acquired by the third sensor 55 covered with the third mosaic of filters 83 gives a matrix $z_i$ as shown in FIG. 6a of size $P_\lambda n_h n_w \times HW(hw)$. Starting from the matrix $z_1$, a matrix $x_1$ of size $n_h n_w \times HW/(hw)$ can be obtained such that $x_1 = M_1 F_1^T C_1 L_1 z_1$ according to relationship (1023). Then, by applying a demosaicing matrix $D_0$ in the form of the demosaicing matrix $D_2$ described in expression (1021), $\tilde{y}_1$ of size $P_\lambda n_h n_w \times HW/(hw)$ such that $\tilde{y}_1 = D_0 x_1$ is obtained. The transformation FtoXYZ is then applied to $\tilde{y}_1$ to obtain the resultant image in the XYZ space according to equation (1011): $\tilde{y}_{XYZ} = (I_{hw} \otimes \text{FtoXYZ})\tilde{y}_1$ of size 3×HW. Finally, by applying matrix A as defined by expression (1018), $\tilde{y}_{sRGB}$ is obtained such that $\tilde{y}_{sRGB} = A(I_{hw} \otimes \text{FtoXYZ})\tilde{y}_{XYZ}$, of size 3×HW. The matrix $\tilde{y}_{sRGB}$ obtained is then "unfolded" in order to reconstruct the third three-component image 105 in the sRGB colour space.

Starting from the different vector matrices shown in FIG. 9, several different ΔE can be calculated: $\Delta E_1$, $\Delta E_2$, $\Delta E_3$ and an MSE, which it is attempted to minimize to optimize the spectral functions and their distribution on the third mosaic of filters 83. The calculations of the different ΔE are carried out according to formulae (1012), (1013), (1014) and (1015).

A first $\Delta E_1$ is calculated between the image contained in the matrix $z_{XYZ}$ produced directly starting from the multispectral reflectance image R(x',y',λ) and the image acquired directly via filters $F_1$, $F_2$, $F_3$ and then passed through the conversion to the XYZ colour space: $y_{OXYZ}$.

A second $\Delta E_2$ is calculated between the image contained in the matrix $z_{XYZ}$ and the image expressed in the XYZ colour space after acquisition by means of the third mosaic of filters 83: $\tilde{y}_{XYZ}$.

A third $\Delta E_3$ is a purely spectral criterion not using reconstruction of an image for testing the colour rendering ability of the filters. To calculate the third $\Delta E_3$, the spectra of a Macbeth test chart or colour chart comprising 24 colours are used. Alternatively, it is also possible to use any other spectral reference base. Starting from the multi-spectral reflectance data of the 24 squares of the Macbeth test chart, on the one hand the transformation into the XYZ colour space is applied directly to obtain a fourth image and on the other hand the filters $F_1$, $F_2$, $F_3$ and the sensitivity of the optical path of the camera and then conversion of the image at the output of the third sensor 55 into the XYZ colour space are applied to obtain a fifth image. The fourth and fifth images are used for calculating the third $\Delta E_3$.

In their turn, MSE and PNSR are calculated between the first image 103 produced directly starting from the multispectral reflectance image and the third image produced starting from the multi-spectral reflectance image after it passes through the mosaic matrix 83 and the third sensor 55.

Figure 10:
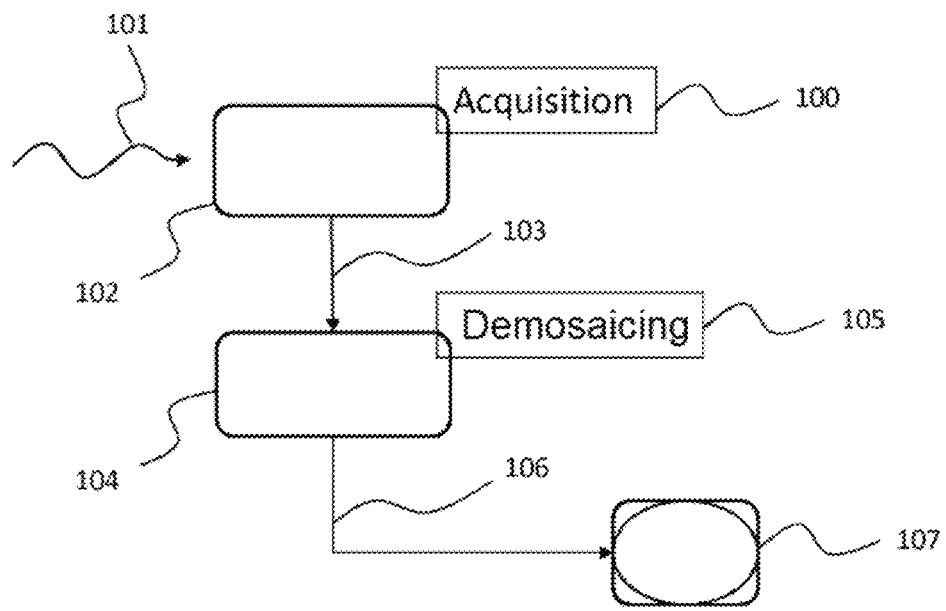
FIG. 10 shows the demosaicing method and device according to the invention.

FIG. 10 shows the demosaicing device and method according to the invention.

A first step 100 is a step of acquisition of a colour image 101 by an image acquisition device 102. The image acquisition device 102 comprises a sensor 2, 55 as shown in FIGS. 1a, 5 and 8. The image acquisition device 102 further comprises a mosaic filter 3, 57, 83, or mosaic of filters, in the form of a matrix of HW filters as shown in FIGS. 1a, 5 and 8. The mosaic of filters 3, 57, 83 is applied to the sensor. The device also comprises an optical device that causes the light captured by the camera to converge towards the sensor 2, 55 equipped with the mosaic filter 3, 57, 83. Thus, before reaching a cell of the sensor 2, 55, the light passes through one of the colour filters 7 of the mosaic of filters 3, 57, 83. A raw signal 103 originating from the sensor 2, 55 can be represented in the form of a mosaic image 40 of size H×W as shown in FIG. 4a. The mosaic image 40 is then transmitted to a first calculator or computer 104, which carries out a demosaicing operation 105 according to the invention. The demosaicing operation consists of multiplying the mosaic image 40 represented in matrix form $x_1$ as shown in FIG. 4a by a demosaicing matrix $D_0$, $D_1$, $D_2$. The result of the demosaicing operation 105 is a vector matrix, which is transformed into an image produced with several colour components according to the inverse process to that shown in FIG. 2b, which consists of "unfolding" the vector matrix to represent it in the form of an image with several components. The reconstructed image 106 can then be transmitted to a suitable means for exploitation thereof, such as a display 107.

Figure 11:
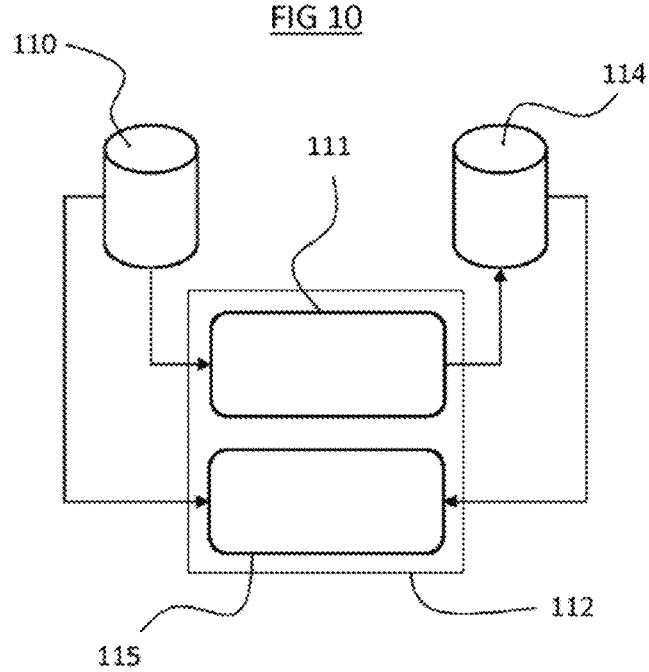
FIG. 11 shows the method for constructing a demosaicing matrix according to the invention.

FIG. 11 shows a method and its device for constructing a demosaicing matrix.

The device for constructing a demosaicing matrix comprises a first database 110. The first database 110 comprises so-called reference images. The reference images may be multi-component images, or multi-spectral images. The reference images may also be images outside of the visible spectrum. Starting from the first database 110, a first step of constructing a demosaicing matrix is a step of modelling mosaic images from a sensor covered with a mosaic of filters. The modelling is carried out by a simulation application 111 that implements a model of the sensor 2, 55. The simulation application 111 may be executed by one or more processors of a second calculator, or computer 112. Alternatively, the simulation application 111 may be executed by the first calculator 104.

Starting from each reference image, the simulation application 111 produces a mosaic image, which will populate a second database 114 of so-called mosaic images.

Once the second database 114 has been constructed, the second step 115 of the method for constructing the demosaicing matrix can be implemented. The method for constructing the demosaicing matrix can be carried out by a computer program, which is executed on one or more processors of the second calculator 112. Alternatively, the method for constructing the demosaicing matrix can be carried out on a third calculator, or computer (not shown), or else the first calculator 104. The method for constructing a demosaicing matrix uses the images of the two databases 110, 114. The first database 110 is used in order to produce a mosaic image starting from a reference image by applying to it a demosaicing matrix under test, i.e. using the demosaicing method according to the invention. The mosaic image thus produced is then compared with the mosaic image corresponding to the reference image in the second database 114. This comparison consists of calculating an error between the mosaic matrix produced by simulation and the mosaic matrix constructed by application of the demosaicing matrix under test. The method for constructing the demosaicing matrix is an iterative method: if the error of construction of the mosaic matrix is below a threshold, the method stops. If otherwise, a new demosaicing matrix is determined and tested.

The different embodiments of the present invention comprise various steps. These steps may be carried out by machine instructions executable by means of a microprocessor, for example.

Alternatively, these steps may be carried out by specific integrated circuits comprising hard-wired logic for executing the steps, or by any combination of programmable components and personalized components.

The present invention may also be supplied in the form of a computer program product, which may comprise a non-transitory computer storage medium containing instructions executable on a data processing machine, these instructions being usable for programming a computer (or any other electronic device) for executing the methods.

The invention claimed is:

1. A method for reconstructing a colour image acquired by a photosensitive sensor of size H×W, covered with a mosaic, of size H×W, of P filters of different colours making up a base pattern of size h×w such that h<H and w<W, said base pattern of the mosaic of filters being repeated so as to cover the mosaic of filters without overlap between the base patterns, said method being carried out by computer and comprising at least the following steps:

a first preliminary step of constructing a demosaicing matrix D starting from a simulation using a first database of N images $I_i$, $i \in [1, \ldots, N]$, with P colour components, called reference images, for producing a second database of N images $J_i$, $i \in [1, \ldots, N]$ simulating images produced originating from the sensor, after acquisition by said sensor of the images of the first database, said reference images $I_i$ and images produced $J_i$ being represented respectively in the form of matrices of HW/(hw) vectors $y_1$, $x_1$ such that:

the components of $y_1$ are the P components of a reduced neighbourhood of size $n_h \times n_w$ of one of the HW/(hw) base patterns applied to the reference image $I_i$, the components of $x_1$ are the components of a reduced neighbourhood of size $n_h \times n_w$ of one of the HW/(hw) base patterns applied to the image produced $J_i$, with $n_h > h$ and $n_w > w$; and a second step of reconstructing a colour image producing the product of the demosaicing matrix D with a matrix representation of a mosaic image originating from the sensor after acquisition of the colour image by said sensor, said product of the demosaicing matrix D with the matrix representation of the mosaic image using an interpolation of the colour of each pixel of the mosaic image as a function of a neighbourhood, of size $n_h \times n_w$ pixels, of a base pattern (43) of size h×w, corresponding to the base pattern of the mosaic of filters.

2. The method according to claim 1, characterized in that $n_h n_w = Phw$.

3. The method according to claim 1, characterized in that a first demosaicing matrix $D_1$ is expressed as an expected value E calculated on the N reference images of the first database: $D_1 = E^{i=1 \cdots N}\{yx_1^T(x_1 x_1^T)^{-1}\}$, where y is a matrix of HW/(hw) vectors of size Phw representing the colour image.

4. The method according to claim 3, characterized in that the first demosaicing matrix $D_1$ is expressed thus: $D_1 = S_1 RM_1^T (M_1 RM_1^T)^{-1}$ with $x_1 = M_1 y_1$, $M_1$ being a matrix of projection of $y_1$ onto $x_1$, $y = S_1 y_1$, $S_1$ being a matrix of reduction of the neighbourhood of the vector $y_1$ and of transformation of the vector $y_1$ into y, and $$R = \frac{1}{NPHW} E^{i=1...N}\{y_1 y_1^T\}$$

being a correlation matrix of the resolved images of the first database expressed as a function of the reduced neighbourhoods of size $n_h \times n_w$.

5. The method according to claim 1, characterized in that the demosaicing matrix is expressed as a function of the spectral sensitivity of the sensor and of the spectral functions of the P filters of different colours.

6. The method according to claim 5, characterized in that, with the first database comprising multi-spectral reflectance images, a second demosaicing matrix $D_2$ is defined by the expression:

$$D_2 = F^T C L S_1 R' L_1^T C_1^T F_1 M_1^T (M_1 F_1^T C_1 L_1 R' L_1^T C_1^T F_1 M_1^T)^{-1},$$

with $R' = \frac{1}{NHWP_\lambda} E^{i=1...N}\{z_1 z_1^T\}$, the second demosaicing matrix $D_2$ being constructed according to the following steps:
- calculation of a vector matrix $y_0$ representing an image with P components as a function of a vector matrix $z_0$ representing a multi-spectral reflectance image obtained from a reflection of an object illuminated by a light source of spectral power density $L(\lambda)$, $\lambda$ being a spectral component, such that: $y_0 = F_0^T C_0 L_0 z_0$, where $F_0$ is a matrix of size $P_\lambda \times P$ of spectral transmission functions of the filters of the mosaic, $C_0$ is a diagonal matrix of size $P_\lambda \times P_\lambda$ of a spectral sensitivity of the sensor, $L_0$ is a diagonal matrix of size $P_\lambda \times P_\lambda$ of the spectral power densities of the light source;
- construction of the vector matrix y starting from the multi-component image and a vector matrix z, constructed starting from the multi-spectral reflectance image, said vector matrices y and z comprising said base pattern, such that $y = F^T C L_z$ with $F = I_{hw} \otimes F_0$, $I_{hw}$ being an identity matrix of dimensions $hw \times hw$, $C = I_{hw} \otimes C_0$, and $L = I_{hw} \otimes L_0$;
- construction of a vector matrix $z_1$ composed of the reduced neighbourhoods of size $n_h \times n_w$ of the base pattern of the multi-spectral reflectance image such that $y_1 = F_1^T C_1 L_1 z_1$, $y_1$ being a matrix composed of the reduced neighbourhoods of size $n_h \times n_w$ of the base pattern of size $h \times w$ of the multi-spectral reflectance spectral image, with $F_1 = I_{n_h n_w} \otimes F_0$, $I_{n_h n_w}$ being an identity matrix of dimensions $n_h n_w \times n_h n_w$, $L_1 = I_{n_h n_w} \otimes L_0$ and $C_1 = I_{n_h n_w} \otimes C_0$; and
- construction of the second demosaicing matrix $D_2$ with $M_1$ being a matrix of projection of $y_1$ onto $x_1$ and $S_1$ being a matrix of reduction of the neighbourhood of the vector $y_1$ and of transformation into y.

7. The method according claim 6, characterized in that $C_0$ is a product of the spectral sensitivities of components of the camera's optical path and the spectral sensitivity of the sensor, said components comprising at least one of the following: an objective of the camera, an infrared filter, a low-pass spatial filter, a microlens system.

8. The method according to claim 1, characterized in that each row of the demosaicing matrix $D$, $D_1$, $D_2$ is expressed as a convolution filter.

9. A data processing system comprising means for carrying out the steps of the method according to claim 1.

10. A non-transitory computer program product comprising instructions which, when the program is executed by a computer, lead the computer to carry out the steps of the method according to claim 1.

11. A method optimizing spectral functions of filters and arranging the filters on a mosaic of P filters of different colours, repeated so as to fill a base pattern of size $h \times w$, said base pattern being repeated so as to cover the mosaic of filters, said mosaic of filters being applied to a photosensitive sensor, said method comprises: a multicriteria optimization by minimizing an error of colour rendering and by minimizing a mean square error between an image originating from an ideal sensor, acquired starting from an image of a database of reference images, and an image originating from a sensor covered with the mosaic of P different filters, acquired starting from the same image of the database of reference images, said image acquired by the sensor covered with the mosaic of filters being reconstructed by the method according to claim 1.

12. The method according to claim 11, characterized in that it further comprises minimizing an error of colour rendering between the image originating from the ideal sensor acquired starting from the image of the image database, and an image originating from a sensor covered with a series of P filters, each of the P filters covering the whole of the sensor, said image being acquired starting from the same image of the database.

13. The according to claim 12, characterized in that it further comprises minimizing an error of colour rendering between a Macbeth test chart acquired by a perfect sensor and a Macbeth test chart acquired by a sensor provided with the mosaic of the P filters.

14. A data processing system comprising means for carrying out the steps of the method according to claim 11.

15. A non-transistor computer program product comprising instructions which, when the program is executed by a computer, cause the computer to carry out the steps of the method according to claim 11.

* * * * *